US007443393B2

(12) United States Patent
Shen et al.

(10) Patent No.: US 7,443,393 B2
(45) Date of Patent: Oct. 28, 2008

(54) METHOD, SYSTEM, AND PROGRAM PRODUCT FOR RE-MESHING OF A THREE-DIMENSIONAL INPUT MODEL USING PROGRESSIVE IMPLICIT APPROXIMATING LEVELS

(75) Inventors: Chen S. Shen, Hawthorne, NY (US); Ioana M. Boier-Martin, Hawthorne, NY (US)

(73) Assignee: International Business Machines Corporation, Armonk, NY (US)

( * ) Notice: Subject to any disclaimer, the term of this patent is extended or adjusted under 35 U.S.C. 154(b) by 193 days.

(21) Appl. No.: 11/335,277

(22) Filed: Jan. 19, 2006

(65) Prior Publication Data
US 2007/0165025 A1 Jul. 19, 2007

(51) Int. Cl.
G06T 17/00 (2006.01)
G06T 15/00 (2006.01)
G06T 15/30 (2006.01)
(52) U.S. Cl. .................. 345/420; 345/419; 345/423
(58) Field of Classification Search .......... 345/423, 345/428, 419, 420
See application file for complete search history.

(56) References Cited

U.S. PATENT DOCUMENTS

2004/0075659 A1   4/2004   Taubin

OTHER PUBLICATIONS

Shen et al., "Interpolating and Approximating Implicit Surfaces from Polygon Soup", 2004, ACM, pp. 204-212.*
Yamakawa et al., "Triangular/Quadrilateral Remeshing of an Arbitrary Polygonal Surface Via Packing Bubbles", Proceedings of Geometric Modeling and Processing Apr. 13-15, 2004, pp. 153-162.

Shinha et al., "A Two-Stage Algorithm for Discontinuity-Preserving Surface Reconstruction", IEEE Transactions on Pattern Analysis and Machine Intelligence, vol. 14, No. 1, Jan. 1992, pp. 36-55.
Chongjiang Du, "An Interpolation Method for Grid-Based Terrain Modelling", Computer Journal, vol. 39, No. 10, published 1996, pp. 837-843, Publisher: Oxford University Press for British Computer Society.
Scitovski et al., "Approximating Surfaces by Moving Total Least Squares Method", Applied Mathematics and Computation, vol. 93, No. 2-3, Jul. 15, 1998, pp. 219-232.
Duan et al., "A Subdivision-Based Deformable Model for Surface Reconstruction of Unknown Topology", Graphical Models, vol. 66, No. 4, Jul. 2004, pp. 181-202.
Duan et al., A Novel Modeling Algorithm for Shape Recovery of Unknown Topology, Part 1, vol. 1, pp. 402-409, Eighth IEEE International Conference on Computer Vision (ICCV) Jul. 7-14, 2001.

* cited by examiner

Primary Examiner—Chante Harrison
(74) Attorney, Agent, or Firm—Hoffman Warnick LLC; Brian Verminski

(57) ABSTRACT

A method, system and program product for re-meshing of a three-dimensional (3D)input model using progressive implicit approximating levels are provided. Specifically, an initial quadrilateral mesh for a 3D input model is provided. Then, an implicit approximating field is built for a first approximating level (L) of the 3D input model using an implicit surface modeling technique. An iso-contour of the implicit approximating field is then extracted, and the quadrilateral mesh is fit to the first approximating level (L). The fit between the quadrilateral mesh and the first approximating level (L) is then estimated, and it is determined whether the fit meets a predetermined quality criterion. If not, the quadrilateral mesh is refined using one or more of a sequence of topological operations are performed to improve the fit. The process is then iteratively repeated for subsequent approximation levels until one of the subsequent approximation levels is fit to the 3D input model.

6 Claims, 11 Drawing Sheets

METHOD, SYSTEM, AND PROGRAM PRODUCT FOR RE-MESHING OF A THREE-DIMENSIONAL INPUT MODEL USING PROGRESSIVE IMPLICIT APPROXIMATING LEVELS

BACKGROUND OF THE INVENTION

1. Field of the Invention

The present invention generally relates to geometric modeling in computer graphics (CG). Specifically, the present invention relates to a method, system and program product for re-meshing of a three-dimensional input model using progressive implicit approximating levels.

2. Related Art

Geometric modeling is a fundamental problem in computer graphics (CG). Typical CG pipelines favor triangles as the most commonly used geometric primitives since triangle meshes are easy to model, render, and animate. Recently, quadrilateral-based subdivision surfaces have been proven to offer advantages over triangle meshes for modeling and editing of complex shapes.

The conversion of a given triangle mesh into a quad-based semi-regular mesh suitable for generating a subdivision surface requires re-meshing. Automatically generating an all-quads manifold surface with a small number of quads so as to keep the complexity of subdivided meshes derived from it low, yet sufficient to capture input features, is a challenging problem. A given triangulated model might have millions of triangles that capture all surface details. A multi-resolution subdivision surface that describes the same model will have a much coarser base mesh and a sequence of detail levels that describe progressively better approximations of the input surface through offset or detail vectors with respect to the positions obtained by subdivision of control meshes on coarser levels. One challenge is to find a suitable coarse mesh, which does not have too many faces, yet optimizes the placement of these faces with respect to the input geometry so that the input can be approximated well with only few and small perturbations (i.e., offsets or details).

A good quality base mesh captures the important geometric properties of the original mesh, such as topology, symmetry and sharp features. Some efforts have been made in this field. For example, one method to achieve this goal is to first decimate then re-arrange the connectivity of the input triangle mesh to produce a quad mesh. A sequence of local re-meshing operations such as triangle pairings makes this scheme fail to preserve global properties such as symmetry of the original shape and the output heavily depends on the original connectivity. Other recent works make use of vector fields defined on the mesh surface to guide the re-meshing operations. Such methods lead to meshes that better capture symmetries, but they result in relatively fine meshes with many elements (the number of elements will be proportional to the size of the smallest feature of the object). Although this new idea offers the ability to re-mesh without dependency on the input connectivity, this strategy remains a surface-based approach that limits the manipulation over the 2D domain of the surface.

SUMMARY OF THE INVENTION

In general, the present invention provides a method, system and program product for re-meshing of a three-dimensional input model using progressive implicit approximating levels. Specifically, the present invention introduces a new strategy based on a volumetric (3D) perspective. Under the present invention, the same volume bounded by an input triangle model is captured using a sequence of implicit approximating surfaces that start with a coarse approximation and converge to the input shape. A quadrilateral mesh is built incrementally based on these implicit representations.

Under the present invention, an implicit distance field is first built by using a technique such as the implicit moving least squares (iMLS) method. Then, a quadrilateral mesh is extracted using this implicit distance field. From fine to coarse, this technique smoothes out surface details and provides a list of nested contours starting from the center of the input model and growing outward. In one embodiment, from coarse to fine, the output quadrilateral mesh is initialized as the bounding box of the input and refined to fit each contour progressively from outer layers toward the center. Each refinement is an iterative procedure. To this extent, the error between the current quadrilateral mesh and the selected contour is estimated and minimized for each vertex, edge and face through a sequence of mesh operations such as snapping vertices, splitting edges, extruding faces, and/or bridging faces.

A first aspect of the present invention provides a method for quadrilateral re-meshing of a three-dimensional (3D) input model using progressive implicit approximating levels, comprising: providing a quadrilateral mesh for the 3D input model; building an implicit approximating field for a first approximating level (L) of the 3D input model using an implicit surface modeling technique; extracting an iso-contour of the implicit approximating field; fitting the quadrilateral mesh to the first approximating level (L); estimating a fit between the quadrilateral mesh and the first approximating level (L); determining whether the fit meets a predetermined quality criterion; and iteratively repeating the building, extracting, fitting, estimating, and determining for subsequent approximation levels until a predetermined stopping criterion is reached.

A second aspect of the present invention provides a system for quadrilateral re-meshing of a three-dimensional input model using progressive implicit approximating levels, comprising: a system for providing a quadrilateral mesh for the 3D input model; a system for building an implicit approximating field for a first approximating level (L) of the 3D input model using an implicit surface modeling technique; a system for extracting an iso-contour of the implicit approximating field; a system for fitting the quadrilateral mesh to the first approximating level (L); a system for estimating a fit between the quadrilateral mesh and the first approximating level (L); and a system for determining whether the fit meets a predetermined quality criterion.

A third aspect of the present invention provides a program product stored on a computer useable medium for quadrilateral re-meshing of a three-dimensional (3D) input model using progressive implicit approximating levels, the computer useable medium comprising program code for causing a computer system to perform the following steps: providing a quadrilateral mesh for the 3D input model; building an implicit approximating field for a first approximating level (L) of the 3D input model using an implicit surface modeling technique; extracting an iso-contour of the implicit approximating field; fitting the quadrilateral mesh to the first approximating level (L); estimating a fit between the quadrilateral mesh and the first approximating level (L); determining whether the fit meets a predetermined quality criterion; and iteratively repeating the building, extracting, fitting, estimating, and determining for subsequent approximation levels until a predetermined stopping criterion is reached.

A fourth aspect of the present invention provides a method for deploying an application for quadrilateral re-meshing of a three-dimensional (3D) input model using progressive implicit approximating levels, comprising: providing a computer infrastructure being operable to: provide a quadrilateral mesh for the 3D input model; build an implicit approximating field for a first approximating level (L) of the 3D input model using an implicit surface modeling technique; extract an iso-contour of the implicit approximating field; fit the quadrilateral mesh to the first approximating level (L); estimate a fit between the quadrilateral mesh and the first approximating level (L); and determine whether the fit meets a predetermined quality criterion.

Therefore, the present invention provides a method, system and program product for re-meshing of a three-dimensional (3D) input model using progressive implicit approximating levels.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

For convenience purposes, the Detailed Description of the Invention will have the following sub-sections.

I. General Description
  A. Volume Representation with Implicit Surface Modeling
  B. Volume Contouring
II. Computerized Implementation I. General Description In general, the present invention is based on multiple observations. First, it is recognized that local re-meshing operations applied directly to the original connectivity of an input mesh fail to preserve the global structure of the geometry, and generate output that heavily depends on the original mesh connectivity. For the same geometry model with different mesh representations, this surface strategy might generate two completely different re-meshing results. Instead, it is desirable to obtain a unique subdivision base mesh that captures the basic shape information of the input. To achieve this, in contrast to prior surface-based methods, the present invention considers the geometric model not only as a two-dimensional (2D) manifold surface, but also as a three-dimensional (3D) volume bounded by the surface mesh. Regardless of the mesh connectivity, different surface meshes with the same geometric shape share the same 3D volume.

Under the present invention (and as will be further described below), the volume bounded by the surface mesh is determined, and then contoured with a quadrilateral base mesh. Working on the volume instead of the surface mesh itself provides the freedom to ignore the original connectivity and to keep only the shape information. A second observation is that converting a complicated surface mesh with many fine details is difficult. Finding the volume bounded by such a mesh hinders the re-meshing process since when looking for a good coarse base mesh it is not desirable to focus on small surface details which are not representative of the general object shape. One goal of the present invention in building a subdivision base mesh is to get rid of high-frequency surface details which will be later captured through detail vectors.

Figure 1C:
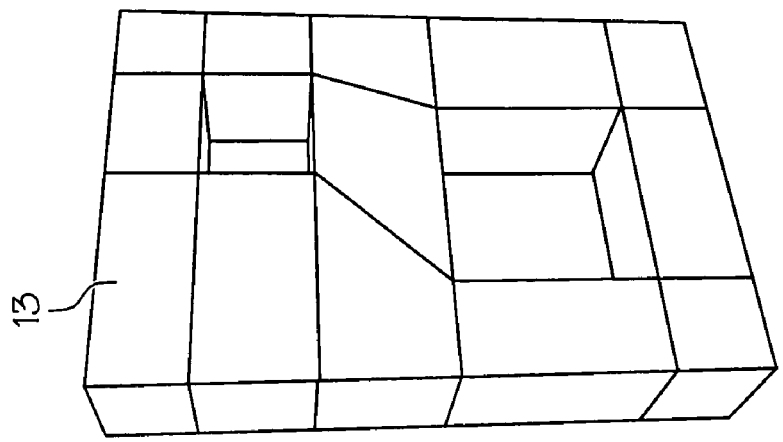
FIG. 1C depicts an extracted quadrilateral mesh, according to the present invention.
Figure 1B:
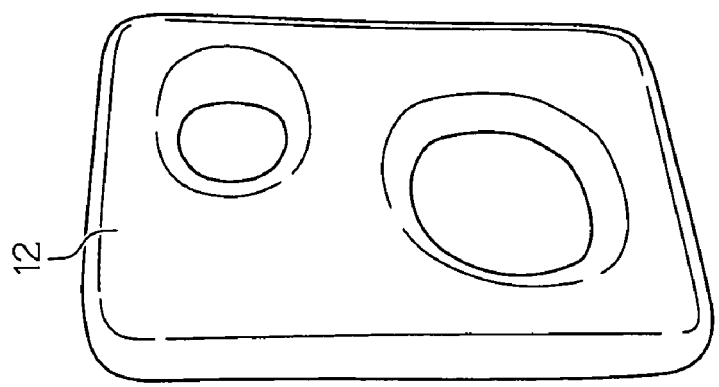
FIG. 1B depicts a representation of the input model of FIG. 1A.
Figure 1A:
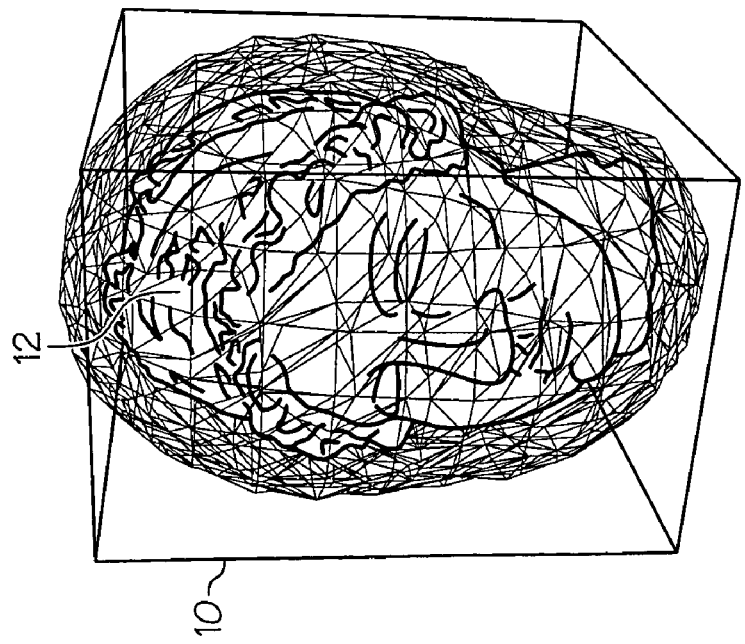
FIG. 1A depicts elements of the re-meshing procedure (i.e., the initial quadrilateral mesh used to initialize re-meshing, the input model, and an intermediate level), according to the present invention.

Instead, the present invention focuses on the global geometric properties such as topology and symmetry. To achieve this, several levels of details for the original shape are recorded. As mentioned, mesh simplification strategies can heavily depend on the original mesh connectivity and tend to generate connectivity-dependent results, which are what the present invention avoids. Thus, the present invention builds a multi-level volumetric representation by smoothing out small volumetric structures and increasingly refining the initial volume into different levels of volume details. Starting from a smooth volume with no fine details, a quadrilateral mesh such as a box or some other simple geometry that coarsely approximates can be fit. Referring to FIG. 1A, an example of this operation is depicted. Specifically, FIG. 1A depicts the fitting of a quadrilateral mesh to a smooth volume. In the example shown in FIG. 1A, the quadrilateral mesh is provided as a bounding box 10 of a 3D input model/volume (surface) 12. FIG. 1B depicts a representation if input model 12, while FIG. 1C depicts an extract QM 13.

Under the present invention, both the smooth volume and the fitted quad mesh maintain the global symmetry property of the original model. By refining the approximation provided by the initial volume to capture more details, the quadrilateral mesh is progressively adjusted to achieve a good subdivision base mesh.

A. Volume Representation with Implicit Surface Modeling

Figure 2:
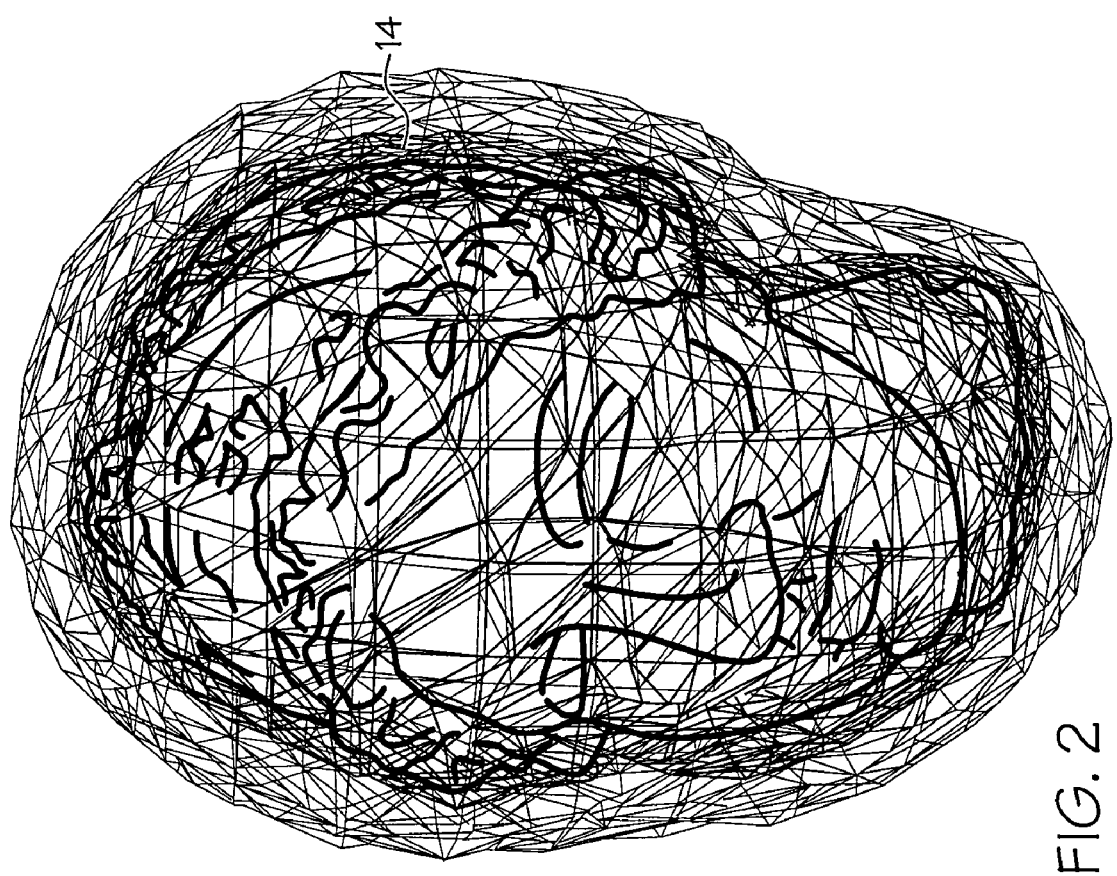
FIG. 2 depicts a list of nested concentric contours in a multi-level volume representation according to the present invention.

Under the present invention, a multi-level volume representation is built using an implicit surface modeling technique such as a Moving Least Squares (MLS) technique. The basic idea is to create an implicit function from an input original surface mesh such that the implicit function has zero values on the surface, negative values inside the volume bounded by the surface mesh and positive values outside. The gradient values of the implicit function also match with the surface normals of the geometry. Such an implicit function is a good approximation of the signed distance function to the surface mesh. By varying a single parameter of the implicit function, the level of detail kept in the volume representation can be easily controlled. A large parameter tends to smooth out volume details whereas a small parameter allows more details to be kept. Referring to FIG. 2, a list of nested concentric contours (approximating levels) 14 in a multi-level volume representation according to the present invention is shown. A parameter value of zero provides an interpolating function for the volume bounded by the original surface mesh.

B. Volume Contouring

In contrast to surface simplification based algorithms, the implicit scheme of the present invention offers a unified framework in which a user can access a level of detail randomly without a sequence of mesh operations. Most importantly, this implicit method does not depend on the input connectivity and provides a continuous functional representation. The implicit function defined over the whole 3D space accurately represents the geometry, however, only in the zero level set of this scalar function is of interest. To this extent, a novel contouring algorithm is utilized to extract the zero iso-contour from the entire implicit function in the form of a quadrilateral mesh that approximates the 2D manifold surface.

When an implicit surface modeling technique such as MLS is used, the surface details are smoothed and curvatures are minimized. As a result, the multi-level volume representation of the present invention forms a list of nested concentric contours starting from the input geometry at the center and growing outward as the smoothness increases. This concept is illustrated in the above-referenced FIG. 2. As will be further described below, the smooth surface of an outer layer can be easily approximated by a simple shape such as a box or other geometric primitives composed of quadrilaterals. Starting from this simple shape, the base mesh is progressively updated using a sequence of mesh operations such that the new base mesh better fits the current level of approximation in the multi-level volumetric representation.

Figure 3:
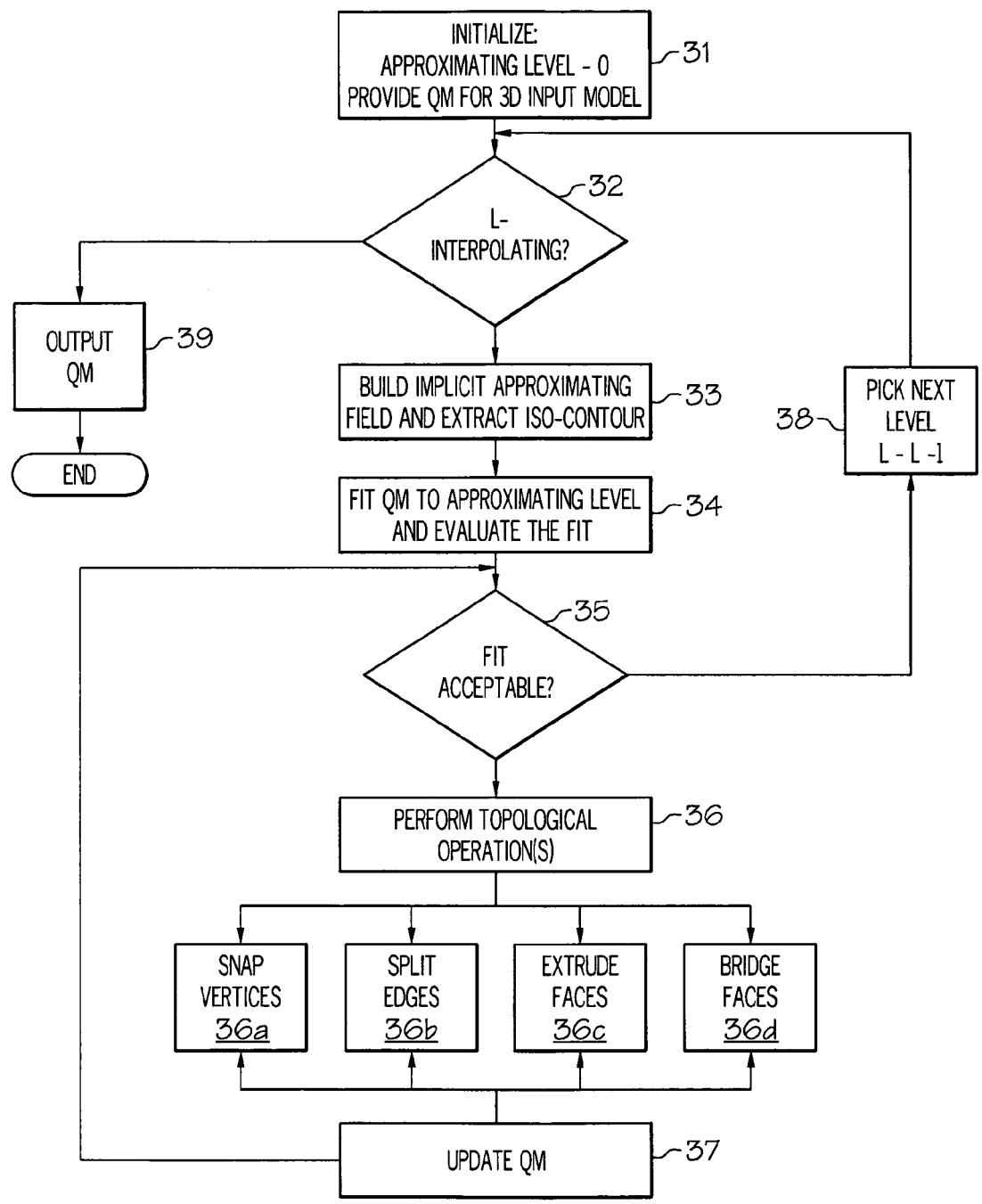
FIG. 3 depicts a method flow diagram according to the present invention.
Figure 4B:
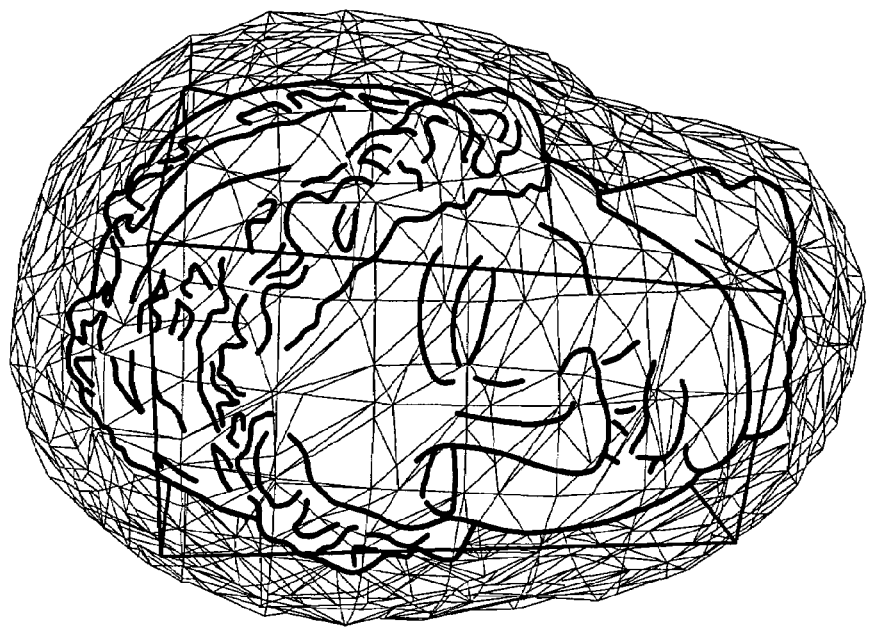
FIG. 4 depicts a sequence of mesh operations according to the present invention.
Figure 4A:
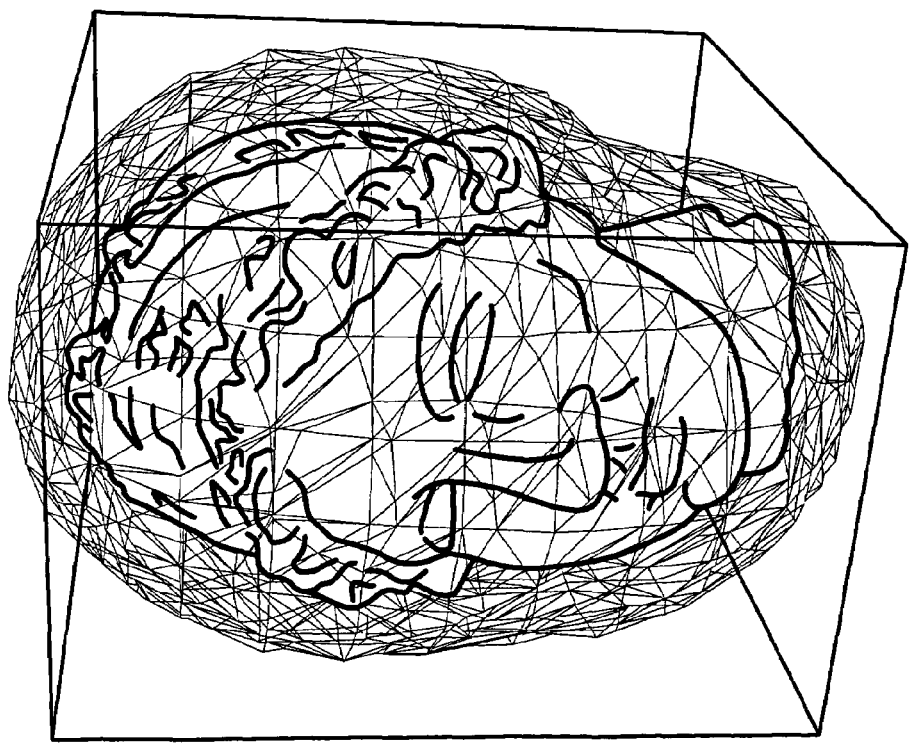
Figure 4D:
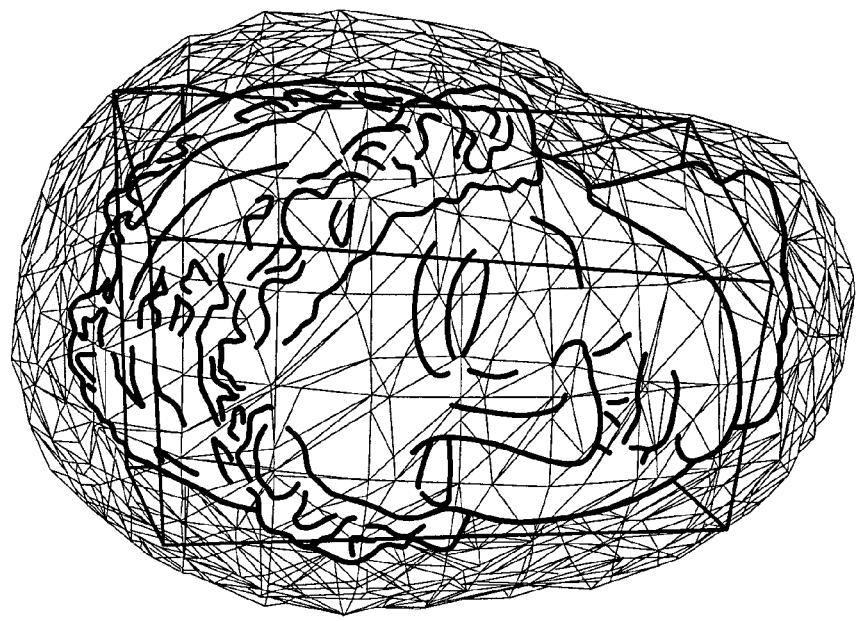
Figure 4C:
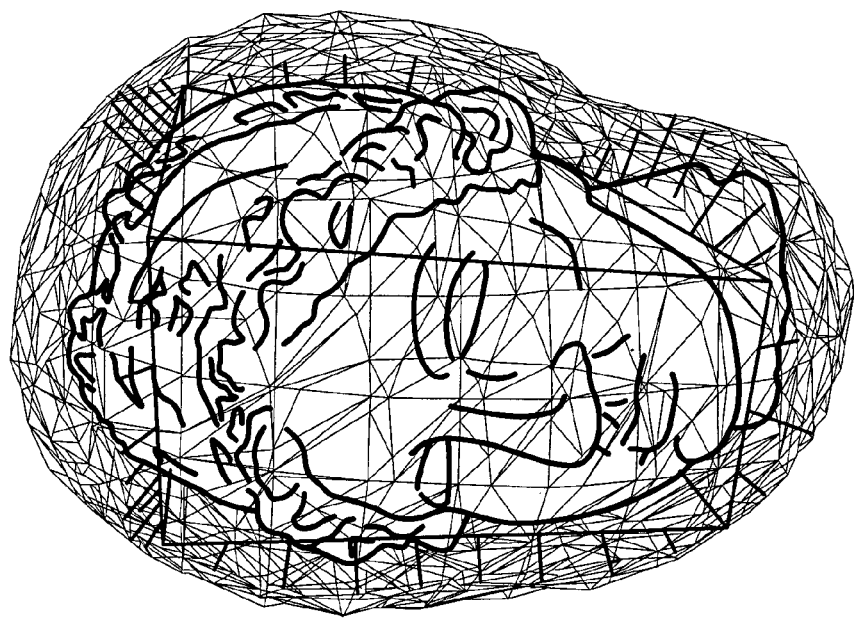
Figure 4F:
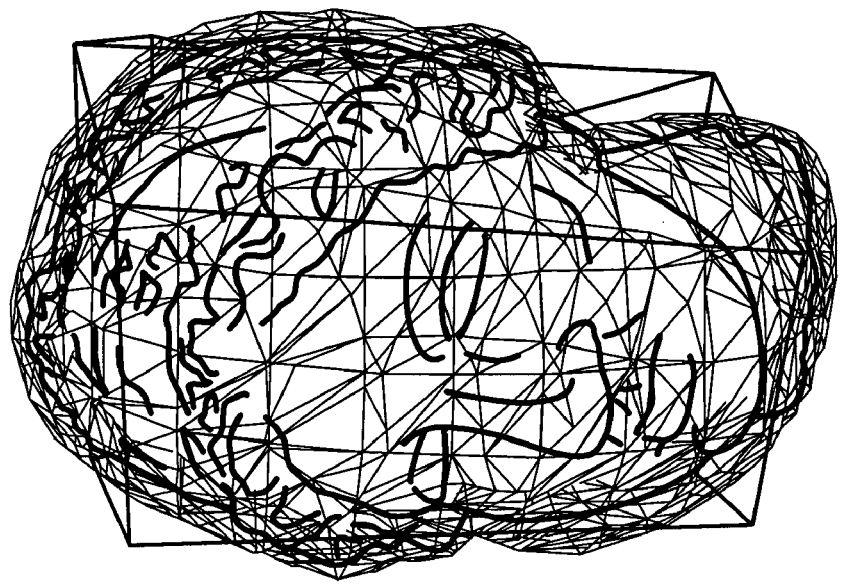
Figure 4E:
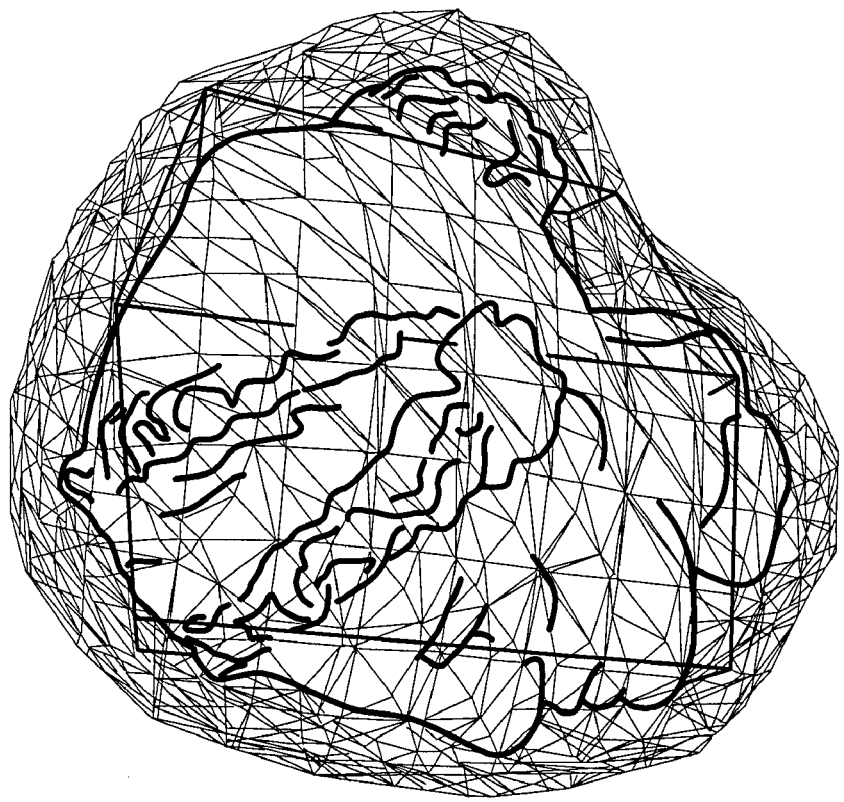
Figure 4H:
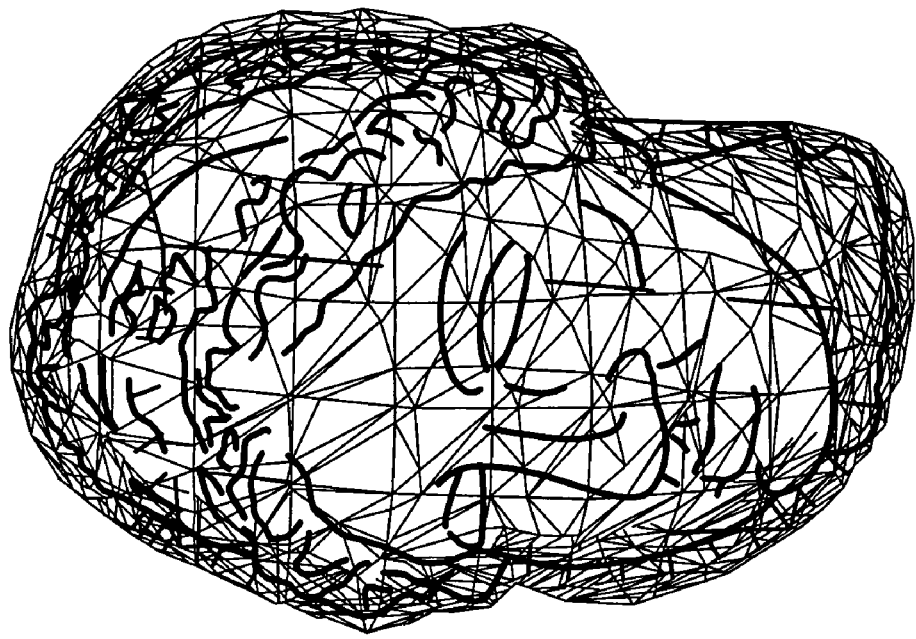
Figure 4G:
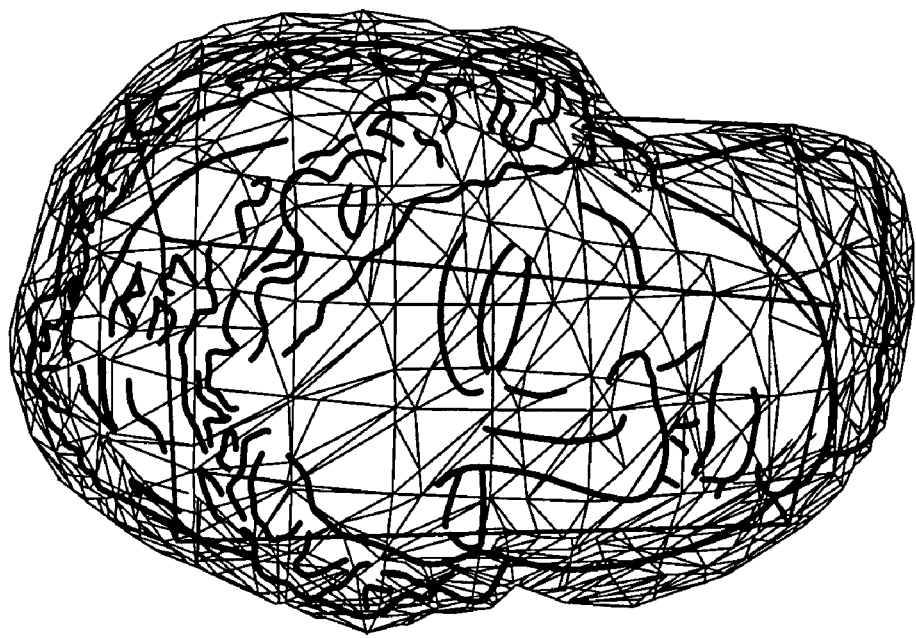
Figure 4I:
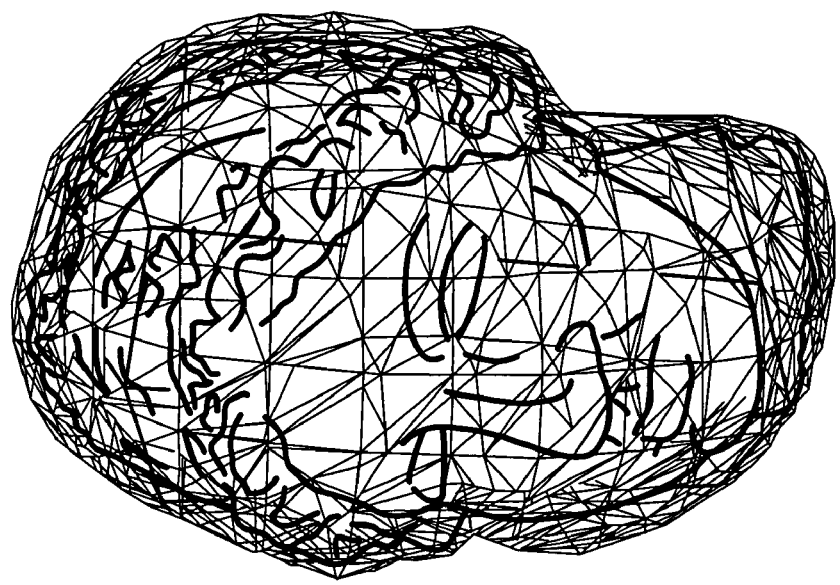
Figure 4J:
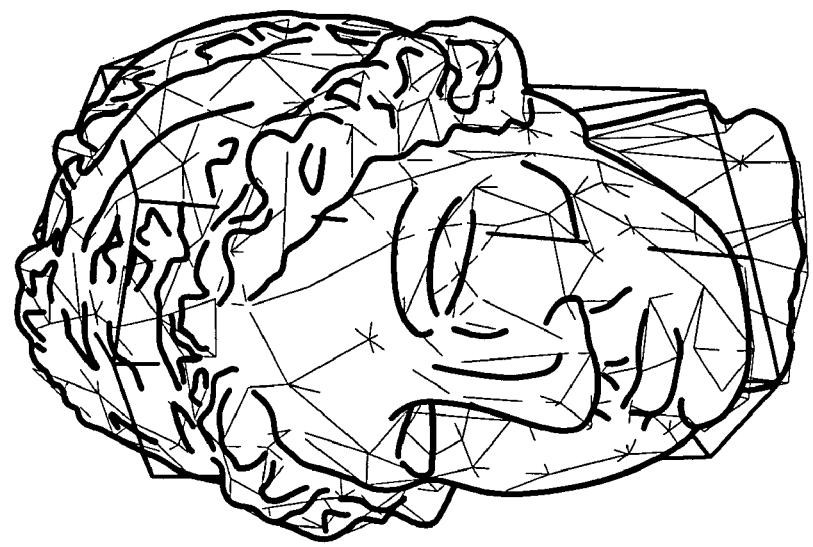
Figure 4L:
Figure 4K:
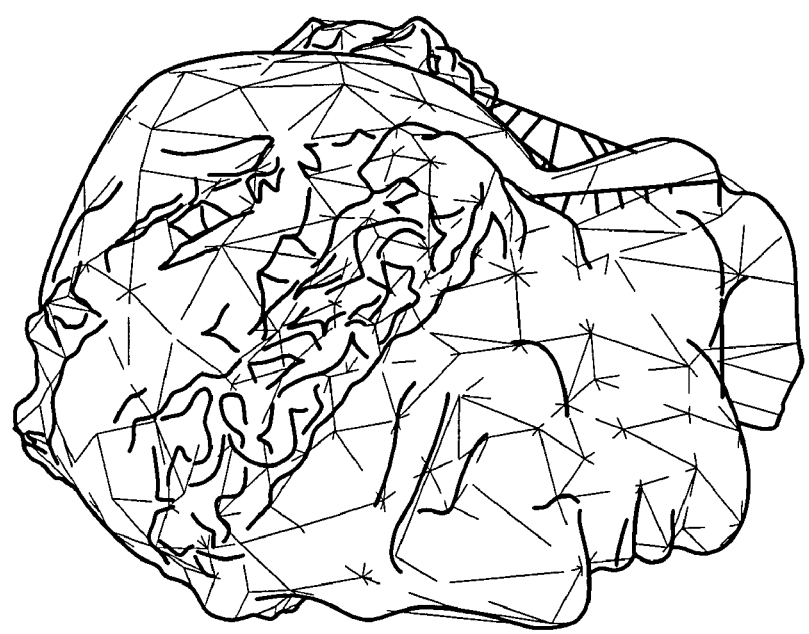

Referring now to the flow diagram of FIG. 3, the quadrilateral re-meshing of a 3D model using progressive implicit approximating surfaces according to the present invention is shown. As can be seen the contouring algorithm of the present invention is iterative. In step S1, a quadrilateral mesh (QM) is initialized/provided for an input model and fit to the smoothest available level (L). In one embodiment, the QM is provided as a bounding box (or other simple geometry primitives) of the input model. In another embodiment, the QM is provided as a polyhedron with quadrilateral faces. In any event, in step S2, all the levels of detail from smooth to finely detailed are iterated through towards the original input model. In step S3, at each level, an implicit approximating field is built using an implicit surface modeling technique such as MLS, and an iso-contour of the implicit approximating field is extracted. In step S4, the QM is fit to the zero iso-contour of the implicit function with the smoothness parameter of the current approximating level, and the fit between the QM and the approximating level L is estimated. The fitting procedure is also an iterative algorithm initialized based on the QM generated from the previous level. By comparison with the previous level, the current level captures more detail. The QM initialization that fitted well to the previous level can now have a big difference with respect to the current level. Thus, in step S5, it is determined whether the fit meets a predetermined quality criterion (i.e., it is determined if the fit is good). Under the present invention, the fit is defined in terms of the distance between QM and the current approximating level L. The distance between the two is measured at vertices, along edges, and across faces according to the metrics described below. Different thresholds can be used for each. If any one of these is above the respective threshold, the fit is considered too coarse, and QM is refined accordingly using at least one of the below described topological operations. If, the fit meets the predetermined quality criterion, the process is iteratively repeated for subsequent approximating levels in step S8 until a predetermined stopping criterion is reached. The predetermined stopping criterion typically includes at least one of the following: the interpolating level being reached, or the last/most recent approximating level being considered to be an acceptable fit to the input model (i.e. fit within a predetermined threshold).

If however, it is determined in step S5 that the fit does not meet the predetermined quality criterion, the difference is iteratively minimized (i.e., the QM is refined) by selecting at least one of a sequence of topological operations in step S6. The choices of operation depend on the kind of difference trying to be resolved. The difference between the output quad mesh to the zero iso-contour is defined in terms of four different types of metrics. These are vertex, edge, face, and volume error metrics (other metrics can also be added and their processing would be similarly treated). The present invention proceeds to optimize them one by one. Hence, the sequence of topological operations shown in FIG. 3 include snapping vertices, splitting edges, extruding faces, and bridging faces of the QM.

In general, vertex error is measured in terms of the distance between a vertex of the output quad mesh and the zero iso-contour of the volumetric representation. To minimize this error, the vertex is snapped to the iso-contour in step S6a. Since the output quad mesh is embedded into the implicit function, which offers a good approximation of the signed distance to the zero iso-contour, this snapping procedure can be achieved, in a preferred implementation as a standard root-finding algorithm. Other methods for computing or estimating distance can also be used. Starting from the 3D location of a vertex, the implicit function value at this point and its gradient vector are first evaluated. From there, a step along the gradient direction is taken with a step size computed based on the implicit function value. Since the difference between two adjacent volumetric levels of detail is relatively small and the implicit function is smooth (since the volume itself is smooth), this root-finding procedure typically converges quickly. This vertex error minimization step does not change the connectivity of the output QM. Rather, it only modifies the positions of vertices. When all vertex errors have been resolved, the mesh can still be a rather poor fit for the zero iso-contour due to edge and face errors.

The present invention defines the edge error of an edge as the total distance from all points on the edge to the zero iso-contour. This can be evaluated, for example, by integrating the absolute implicit function values along the edge. For a given output QM, the edge with the largest edge error is iteratively picked, and the error is resolved by splitting the edge into two pieces in step S6b. There are various ways of picking the split point. For example, one can pick the midpoint. This choice yields a uniformly distributed quad mesh with similar quad shapes. One can also pick the point with the largest distance to the zero iso-contour and split the edge at that point. This strategy helps to keep the mesh well-aligned with the surface features. A combination of such choices can also be used. However, splitting is not a one step procedure since if we only split the picked edge, and a mesh that may have non-quadrilateral faces could result. To meet the constraint of an all-quadrilateral output mesh, we split a whole ring of edges by visiting all neighboring faces to ensure that each of them has valence four. Similarly, we define the face error as the integral of the absolute implicit function values over the entire face. To resolve all of the these, the face with the largest error is iteratively picked, and split into two or four pieces (depending on the error distribution) until all faces end up with errors below some threshold and the faces are either extrude or indent in step S6c. Similar to the edge case, we have different choices when picking split positions and the neighboring faces must also be split to obtain an all-quad mesh. Unlike in the case of vertex errors, when we split an edge or a face to solve an edge error or a face error, a change in the QM connectivity is introduced. However, none of these operations results in a change in the mesh topology. If the input geometry is a complicated shape other than a genus-0 (sphere-like) object, obtaining a correct re-meshing result can not be expected just by performing these three operations. Thus, a mechanism to create handles (i.e., modify the topology) is needed. One way in which this can be achieved is through "hole creation" by evaluating volume errors for an internal volume bounded by two selected faces. Since the implicit function is a good approximation of signed distance, it can easily be determined whether a point is inside or outside the object. Two selected faces are bridged to make a hole if the volume bounded by these two faces contains points with positive implicit function values in step S6d, which means this part of volume should be outside the object. Bridging operations provides us topological changes.

Referring to FIG. 4, a sequence of mesh operations (a)-(l) according to the above description is shown. The sequence is as follows: (a) begin with the smoothest available level and the bounding box as the output quad mesh; (b) snap the vertices of the quad mesh to the current level; (c) estimate edge errors; (d) split the edge with the largest edge error; (e) a different point of view; (f) pick the next best approximation level; (g) snap the vertices to that level; (h) perform edge error estimation; (i) split the selected edge; (j) pick the next level; (k) snap vertices and estimate edge error; (l) split the selected edge.

Figure 5:
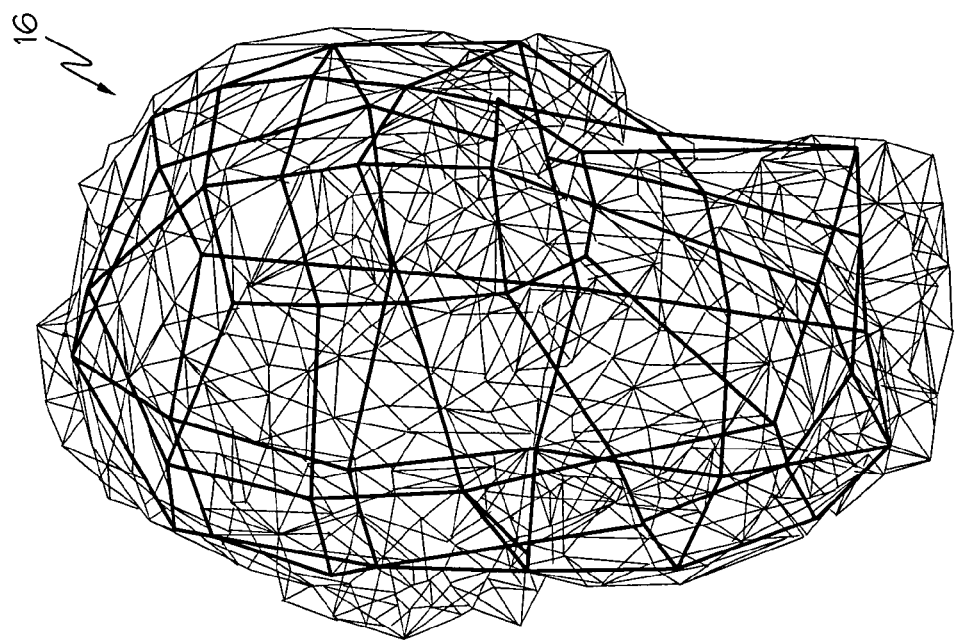
FIG. 5 depicts an output quadrilateral mesh according to the present invention.
Figure 5:
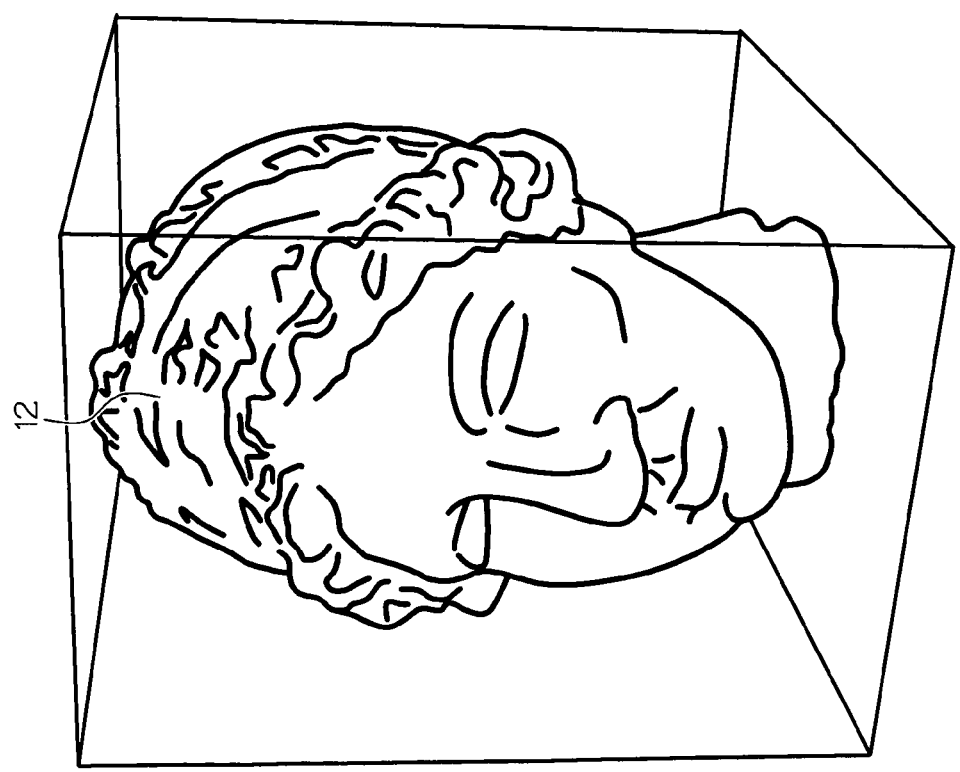

When four different kinds of errors all have been resolved, the current output QM is updated in step S7, and the process repeats with subsequent approximating levels (step S8). When a stopping criterion is reached, the re-meshing result is ready for output in step S9 and the iterative fitting procedure terminates. Under the present invention, the stopping criterion can include at least one of the following, the interpolating level being reached, the last/most recent approximating level is considered to be an acceptable fit to the #D input model. Referring to FIG. 4, an example of the interpolating surface being reached is shown. Specifically, FIG. 5 shows QM provided as a bounding box 10 of input model 12, and the re-meshing result 16 provided by the present invention.

II. Computerized Implementation

Figure 6:
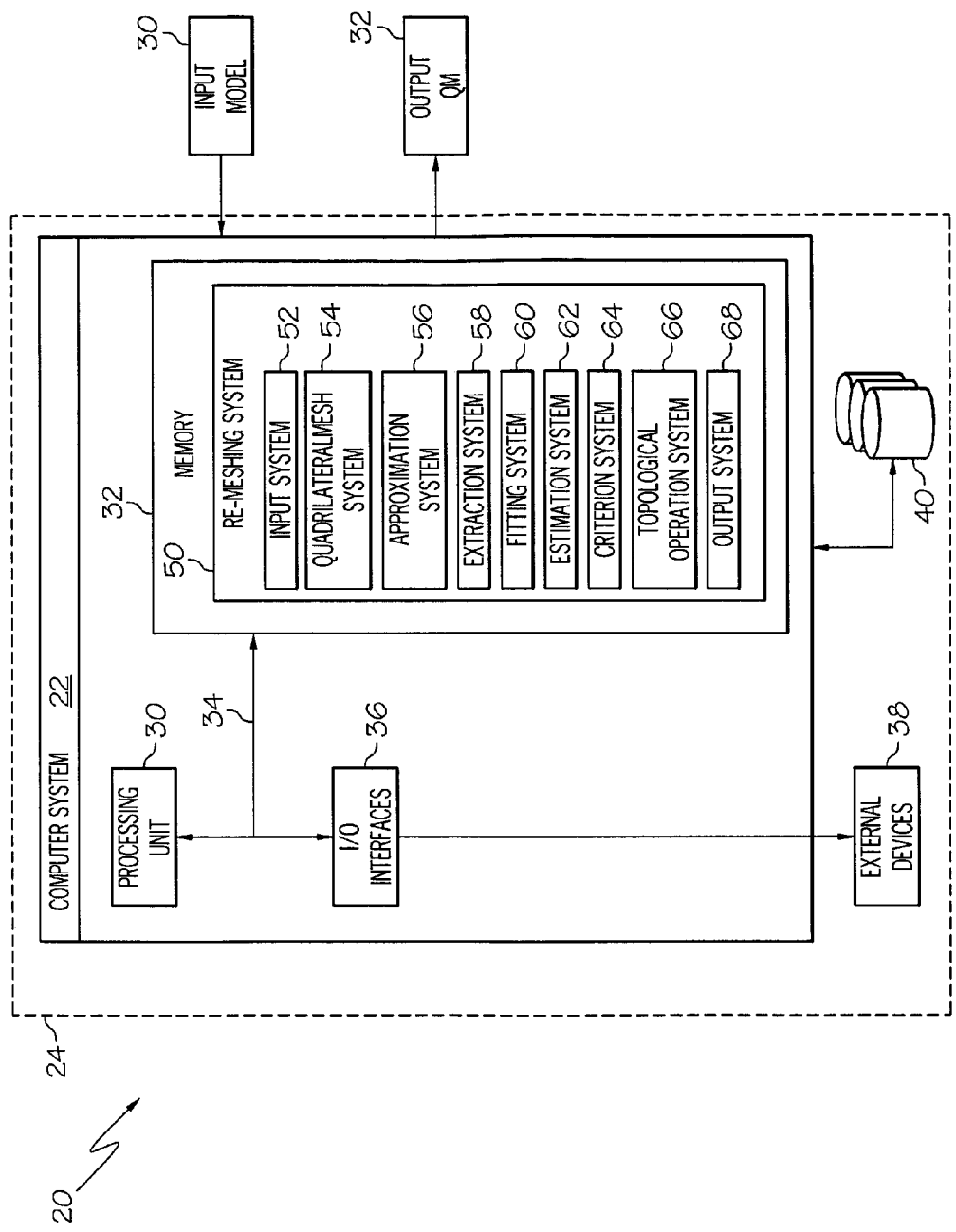
FIG. 6 depicts a more specific computerized implementation according to the present invention.

Referring now to FIG. 6, a system 20 for quadrilateral re-meshing of a 3D model using progressive implicit approximating levels according to the present invention is shown. As depicted, system 20 includes a computer system 22 deployed within a computer infrastructure 24. This is intended to demonstrate, among other things, that the present invention could be implemented within a network environment (e.g., the Internet, a wide area network (WAN), a local area network (LAN), a virtual private network (VPN), etc.), or on a standalone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 24 is intended to demonstrate that some or all of the components of system 20 could be deployed, managed, serviced, etc. by a service provider who offers to provide quadrilateral re-meshing of a 3D input model using progressive implicit approximating levels.

As shown, computer system 22 includes a processing unit 30, a memory 32, a bus 34, and input/output (I/O) interfaces 36. Further, computer system 22 is shown in communication with external I/O devices/resources 38 and storage system 40. In general, processing unit 30 executes computer program code, such as re-meshing system 50, which is stored in memory 32 and/or storage system 40. While executing computer program code, processing unit 30 can read and/or write data to/from memory 32, storage system 40, and/or I/O interfaces 36. Bus 34 provides a communication link between each of the components in computer system 22. External devices 38 can comprise any devices (e.g., keyboard, pointing device, display, etc.) that enable a user to interact with computer system 22 and/or any devices (e.g., network card, modem, etc.) that enable computer system 22 to communicate with one or more other computing devices.

Computer infrastructure 24 is only illustrative of various types of computer infrastructures for implementing the invention. For example, in one embodiment, computer infrastructure 24 comprises two or more computing devices (e.g., a server cluster) that communicate over a network to perform the various process steps of the invention. Moreover, computer system 22 is only representative of various possible computer systems that can include numerous combinations of hardware. To this extent, in other embodiments, computer system 22 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 30 may comprise a single processing unit, or be distributed across one or more processing units in one or more locations, e.g., on a client and server. Similarly, memory 32 and/or storage system 40 can comprise any combination of various types of data storage and/or transmission media that reside at one or more physical locations. Further, I/O interfaces 36 can comprise any system for exchanging information with one or more external devices 38.

Still further, it is understood that one or more additional components (e.g., system software, math co-processing unit, etc.) not shown in FIG. 6 can be included in computer system 22. However, if computer system 22 comprises a handheld device or the like, it is understood that one or more external devices 38 (e.g., a display) and/or storage system(s) 40 could be contained within computer system 22, not externally as shown.

Storage system 40 can be any type of system (e.g., a database) capable of providing storage for information under the present invention, such existing network input models, QMs, algorithms etc. To this extent, storage system 40 could include one or more storage devices, such as a magnetic disk drive or an optical disk drive. In another embodiment, storage system 30 includes data distributed across, for example, a local area network (LAN), wide area network (WAN) or a storage area network (SAN) (not shown). Although not shown, additional components, such as cache memory, communication systems, system software, etc., may be incorporated into computer system 22.

Shown in memory 32 of computer system 22 is re-meshing system 50, which includes input system 52, quadrilateral mesh system 54, approximation system 56, extraction system 58, fitting system 60, estimation system 62, criterion system 64, topological operation system 66, and output system 68. These systems provide the functionality of the present invention as described above. It should be understood, however, that the same functionality could be provided with a different configuration of systems than is shown in FIG. 6.

In any event, input system 52 will receive 3D input model 70. Thereafter, quadrilateral mesh system 54 will provide a QM for input model 70. As indicated above, in one embodiment, the QM is provided as a bounding box of the input model. In another embodiment, the QM is provided as a polyhedron with quadrilateral faces. It should be appreciated, however, that other alternatives could be provided by quadrilateral mesh system 54.

In any event an implicit approximating field for a first approximating level (L) of the input model will be built by approximation system 56 using an implicit surface modeling technique. In a typical embodiment, the surface modeling technique is MLS. Once the implicit approximating field is built, extraction system 58 will extract an iso-contour thereof. Then, the QM will be fit to the first approximating level (L) by fitting system 60, and the fit between the QM and the first approximating level (L) will be estimated by estimation system 62.

Criterion system 64 will then determine whether this fit meets a predetermined quality criterion. If not, topological operation system 66 will perform at least one of a sequence of topological operations on the QM until the fit is satisfactory (meets the predetermined quality criterion). As described above, the sequence of topological operations typically include snapping vertices, splitting edges, extruding faces, and bridging faces of the quadrilateral mesh. This process will be iteratively repeated for subsequent approximating levels until the predetermined stopping criterion is met. When this occurs the QM 72 will be output by output system 68.

While shown and described herein as a method, system, and program product for quadrilateral re-meshing of a 3D model using progressive implicit approximating levels, it is understood that the invention further provides various alternative embodiments. For example, in one embodiment, the invention provides a computer-readable/useable medium that includes computer program code to enable a computer infrastructure to provide quadrilateral re-meshing of a 3D model using progressive implicit approximating levels. To this extent, the computer-readable/useable medium includes program code that implements each of the various process steps of the invention. It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 32 (FIG. 6) and/or storage system 40 (FIG. 6) (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a business method that performs the process steps of the invention on a subscription, advertising, and/or fee basis. That is, a service provider, such as a Solution Integrator, could offer to provide quadrilateral re-meshing of a 3D model using progressive implicit approximating levels. In this case, the service provider can create, maintain, support, etc., a computer infrastructure, such as computer infrastructure 24 (FIG.6) that performs the process steps of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for quadrilateral re-meshing of a 3D model using progressive implicit approximating levels. In this case, a computer infrastructure, such as computer infrastructure 24 (FIG. 6), can be provided and one or more systems for performing the process steps of the invention can be obtained (e.g., created, purchased, used, modified, etc.) and deployed to the computer infrastructure. To this extent, the deployment of a system can comprise one or more of (1) installing program code on a computing device, such as computer system 22 (FIG. 6), from a computer-readable medium; (2) adding one or more computing devices to the computer infrastructure; and (3) incorporating and/or modifying one or more existing systems of the computer infrastructure to enable the computer infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. A method for quadrilateral re-meshing of a three-dimensional (3D) input model using progressive implicit approximating levels, comprising:

providing a quadrilateral mesh for the 3D input model;

building an implicit approximating field for a first approximating level (L) of the 3D input model using an implicit surface modeling technique;

extracting an iso-contour of the implicit approximating field;

fitting the quadrilateral mesh to the first approximating level (L);

estimating a fit between the quadrilateral mesh and the first approximating level (L);

determining whether the fit meets a predetermined quality criterion;

iteratively repeating the building, extracting, fitting, estimating, and determining for subsequent approximation levels until a predetermined stopping criterion is reached; and refining the initial quadrilateral mesh using at least one of a sequence of topological operations to achieve an improved fit after the determining step if the fit fails to meet the predetermined quality criterion;

wherein the quadrilateral mesh is an initial quadrilateral mesh, and wherein the sequence of topological operations comprises snapping vertices, splitting edges, extruding faces, and bridging faces of the quadrilateral mesh.

2. The method of claim 1, the predetermined stopping criterion comprising at least one of the following: an interpolating level being reached, or one of the subsequent approximating levels being fit to the 3D input model within a predetermined threshold, the method further comprising outputting the quadrilateral mesh when the predetermined stopping criterion is reached.

3. The method of claim 1, the quadrilateral mesh being provided as a bounding box of the 3D input model.

4. The method of claim 1, the quadrilateral mesh being provided as a polyhedron with quadrilateral faces.

5. The method of claim 1, the implicit surface modeling technique being an implicit Moving Least Squares (iMLS) technique.

6. A method for deploying an application for quadrilateral re-meshing of a three-dimensional 3D input model using progressive implicit approximating levels, comprising:
   providing a computer infrastructure being operable to:
   provide a quadrilateral mesh for the 3D input model;
   build an implicit approximating field for a first approximating level (L) of the 3D input model using an implicit surface modeling technique;
   extract an iso-contour of the implicit approximating field;
   fit the quadrilateral mesh to the first approximating level (L);
   estimate a fit between the quadrilateral mesh and the first approximating level (L);
   determine whether the fit meets a predetermined quality criterion; and
   refine the initial quadrilateral mesh using at least one of a sequence of topological operations to achieve an improved fit after the determining step if the fit fails to meet the predetermined quality criterion;
   wherein the quadrilateral mesh is an initial quadrilateral mesh,
   and wherein the sequence of topological operations comprises snapping vertices, splitting edges, extruding faces, and bridging faces of the quadrilateral mesh.

* * * * *